(12) United States Patent
Kothari (10) Patent No.: US 10,657,745 B2
(45) Date of Patent: *May 19, 2020

(54) AUTONOMOUS CAR DECISION OVERRIDE

(71) Applicant: Hemanki Kothari, Henrico, VA (US)

(72) Inventor: Hemanki Kothari, Henrico, VA (US)

(73) Assignee: Be TopNotch LLC, Henrico, VA (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/883,352

(22) Filed: Jan. 30, 2018

(65) Prior Publication Data

US 2020/0117187 A1    Apr. 16, 2020

Related U.S. Application Data

(63) Continuation-in-part of application No. 15/491,713, filed on Apr. 19, 2017, now Pat. No. 9,889,861.

(Continued)

(51) Int. Cl.
*B60W 50/10*        (2012.01)
*G06F 3/0482*       (2013.01)
(Continued)

(52) U.S. Cl.
CPC .......... *G07C 9/00563* (2013.01); *B60K 35/00* (2013.01); *B60W 50/0098* (2013.01); *B60W 50/14* (2013.01); *G06F 21/31* (2013.01); *G06F 21/32* (2013.01); *G06F 21/44* (2013.01); *G06K 9/00832* (2013.01); *G08G 1/166* (2013.01); *B60K 2370/126* (2019.05); *B60K 2370/145* (2019.05); *B60K 2370/148* (2019.05); *B60K 2370/1438* (2019.05); *B60K 2370/152* (2019.05); *B60W 2050/0088* (2013.01);
(Continued)

(58) Field of Classification Search
CPC ................. B60W 50/10; B60W 50/14; B60W 2050/146; G05D 1/0088; B60K 35/00; B60K 2350/1044; B60R 25/25; B60R 25/23; G06N 99/005; G07C 9/00563; G06F 21/32; H04W 4/40; H04W 4/48
See application file for complete search history.

(56) References Cited

U.S. PATENT DOCUMENTS 8,346,426 B1 *   1/2013   Szybalski  ............. B60W 50/14
                                                                701/28
8,374,743 B2 *   2/2013   Salinger  ............... G05D 1/0246
                                                                701/23

(Continued)

*Primary Examiner* — Michael J Zanelli
(74) *Attorney, Agent, or Firm* — Ellenoff Grossman & Schole LLP; James M. Smedley; Alex Korona (57) ABSTRACT

A smart device display for an autonomous vehicle, comprising a first display section that displays an external view of the autonomous vehicle, a second display section that displays vehicle actions that the autonomous vehicle will take and a third display section that displays alternative vehicle actions that an authorized passenger of the autonomous vehicle may select to override the vehicle actions. Such system can also comprise an artificial intelligence module that learns the alternative vehicle actions the authorized passenger selects in various intervention situations, wherein the artificial intelligence module uses machine learning algorithms to decide the best alternative vehicle actions that the authorized passenger is likely to select for similar future situations.

24 Claims, 6 Drawing Sheets

Related U.S. Application Data (60) Provisional application No. 62/324,646, filed on Apr. 19, 2016.

(51) Int. Cl.

| | | |
|---|---|---|
| *G07C 9/00* | (2020.01) | |
| *G08G 1/16* | (2006.01) | |
| *G05D 1/00* | (2006.01) | |
| *G06F 3/01* | (2006.01) | |
| *B60R 25/25* | (2013.01) | |
| *B60W 10/18* | (2012.01) | |
| *B60W 10/20* | (2006.01) | |
| *B60W 30/09* | (2012.01) | |
| *B60W 30/14* | (2006.01) | |
| *B60W 50/14* | (2020.01) | |
| *G06F 3/0362* | (2013.01) | |
| *G06F 3/16* | (2006.01) | |
| *B60K 35/00* | (2006.01) | |
| *G06N 99/00* | (2019.01) | |
| *G06F 21/32* | (2013.01) | |
| *G06F 21/44* | (2013.01) | |
| *B60W 50/00* | (2006.01) | |
| *G06K 9/00* | (2006.01) | |
| *G06F 21/31* | (2013.01) | |
| *B60R 25/23* | (2013.01) | |
| *G06N 20/00* | (2019.01) | |

(52) U.S. Cl.
CPC ............ *B60W 2050/0089* (2013.01); *B60W 2050/146* (2013.01); *B60W 2540/04* (2013.01); *B60W 2540/28* (2013.01); *G06N 20/00* (2019.01)

(56) References Cited

U.S. PATENT DOCUMENTS

| | | | |
|---|---|---|---|
| 9,958,870 B1 * | 5/2018 | Graybill | B60W 50/14 |
| 9,971,348 B1 * | 5/2018 | Canavor | G01C 21/3617 |
| 10,331,134 B2 * | 6/2019 | Wood | G05D 1/0088 |
| 10,346,888 B2 * | 7/2019 | Nix | B60W 50/08 |
| 2016/0301698 A1 * | 10/2016 | Katara | G07B 13/02 |
| 2017/0028876 A1 * | 2/2017 | Yamada | B60N 2/012 |
| 2017/0151958 A1 * | 6/2017 | Sakuma | B60W 50/10 |
| 2018/0074497 A1 * | 3/2018 | Tsuji | G06K 9/00288 |

* cited by examiner

AUTONOMOUS CAR DECISION OVERRIDE

CROSS-REFERENCE TO RELATED APPLICATIONS

This application is a Continuation-in-part of U.S. patent application Ser. No. 15/491,713 entitled "Autonomous Car Decision Override" filed on Apr. 19, 2017, which claims priority to U.S. Provisional Patent Application Ser. No. 62/324,646, entitled "Autonomous Car Decision Override" filed on Apr. 19, 2016. The contents of all of the aforementioned patent applications are incorporated herein by reference in their entirety.

BACKGROUND

Currently, passengers of autonomous vehicles have no way to identify the actions the autonomous vehicle will take when a potentially hazardous obstacle, such as a pedestrian, vehicle, animal, or any other obstacle, is detected in the path of the vehicle. Furthermore, autonomous vehicles lack visual indicators to alert passengers that the vehicle is planning on changing speed, stopping, or performing another driving maneuver. This can sometimes build anxiety for the passengers because they do not know what will happen next and also they do not have a way to change the default decision made by the autonomous vehicle. In short, it would be advantageous if there was a way to indicate or convey to the passengers sitting inside the vehicle the next steps that the autonomous vehicle is going to take.

As autonomous vehicles evolve, there is a possibility that autonomous vehicles will not even have a steering wheel in it, so there wouldn't be an option to override autonomous vehicle's decisions. However, the autonomous vehicle itself provides alternative decision options to the passengers keeping the safety in mind, and thereafter, if passengers were able to select those alternative decisions to override vehicle's default decisions, then that would be really helpful, however, such above mentioned feature currently does not exist.

A similar situation to above is that if there was no road or a big ditch in the upcoming path of the autonomous vehicle, however, in case if the autonomous vehicle's default decision was to still proceed on that path, then currently the passengers of the autonomous self driving vehicles do not have a way of knowing what actions or next steps the autonomous vehicle would take until that action is taken. At the same time, the autonomous vehicle passengers also currently do not have a way to change the default decision made by the autonomous vehicle. However, if the passengers were able to select alternative decisions to override vehicle's default decisions, then that would be really helpful, however, such above mentioned features currently do not exist in the autonomous self-driving vehicles.

According to already existing patents granted, autonomous vehicles will indicate to the outside pedestrians about the actions that the autonomous vehicle is about to take. However, there is currently no feature within the autonomous vehicles to display the next steps or actions that the vehicle would take to the passengers sitting inside the vehicle. Also, there is currently no option for passengers to override the autonomous vehicle's default decisions by selecting the alternative decision options that are presented by the autonomous vehicle itself by keeping the safety in mind.

SUMMARY

Described is a visual display for an autonomous vehicle. The visual display includes a first display section that displays an external view of the autonomous vehicle, a second display section that displays vehicle actions that the autonomous vehicle will take and a third display section that displays alternative vehicle actions that an authorized passenger of the autonomous vehicle may select to override the vehicle actions.

Further described is a method for controlling an autonomous vehicle. The method includes displaying an external view of the autonomous vehicle, displaying vehicle actions that the autonomous vehicle will take, displaying alternative vehicle actions that the autonomous vehicle may take, receiving a selection of the alternative vehicle actions from an authorized passenger of the autonomous vehicle and overriding the vehicle actions with the selected alternative vehicle actions.

In addition, a further visual display for an autonomous vehicle is described. The further visual display includes a first display section that displays vehicle actions that the autonomous vehicle will take and a second display section that displays alternative vehicle actions that an authorized passenger of the autonomous vehicle may select to override the vehicle actions.

A decision system for an autonomous vehicle, comprising an input sensor to collect information from passengers to determine if a passenger is an authorized passenger and a display section that displays alternative vehicle actions that an authorized passenger of the autonomous vehicle may select to override vehicle actions of the autonomous vehicle.

A smart device display for an autonomous vehicle, comprising a first display section on the smart device that displays an external view of the autonomous vehicle, a second display section on the smart device that displays vehicle actions that the autonomous vehicle will take, and a third display section on the smart device that displays alternative vehicle actions that an authorized passenger of the autonomous vehicle may select to override the vehicle actions.

The smart device display wherein the first display section further identifies potential hazardous external obstacles based on the external view.

The smart device display wherein the first display section further displays overlaid simulated navigation directions based on the vehicle actions that the autonomous vehicle will take.

The smart device display wherein the vehicle actions are based at least t on sensor readings of external obstacles.

The smart device display wherein one of the first display section or second display section displays one of vehicle malfunctions or sensor malfunctions.

The smart device display wherein either combination of first display, second display and third display can be overlaid on top of each other on the smart device display screen.

The smart device display wherein a user of the smart device display can enable or disable any of the first display, second display or third display on the display screen.

The smart device display wherein the alternative vehicle actions comprise one of slowing down, increasing speed, maintaining the current speed, stopping, altering a course of the vehicle or making a turn.

The smart device display wherein the first display, second display and third display can be simultaneously displayed on both the smart device display screen as well as the display screen within the autonomous vehicle.

The smart device display wherein the first display, second display and third display can be alternatively displayed on the augmented reality view within the autonomous vehicle, allowing the authorized passenger to select the alternative vehicle decision to override the autonomous vehicle decision using the augmented reality view.

The smart device display wherein a passenger is identified as an authorized passenger based on one of a verbal passcode, a hand-entered passcode, or get authorized using a biometric sensor on the smart device.

The smart device display wherein a passenger may speak a pre-set keyword to activate the autonomous vehicle override system or app on their smart device.

The smart device display further comprising an artificial intelligence module that learns the alternative vehicle actions the authorized passenger selects in various intervention situations, wherein the artificial intelligence module uses the learned alternative vehicle actions to display commonly selected alternative vehicle actions to the authorized passenger for similar future situations.

A method for overriding an autonomous vehicle decision using a smart device, comprising displaying an external view of the autonomous vehicle, displaying vehicle actions that the autonomous vehicle will take, displaying alternative vehicle actions that the autonomous vehicle may take, receiving a selection of the alternative vehicle actions from an authorized passenger of the autonomous vehicle using a smart device, and overriding the vehicle actions with the selected alternative vehicle actions.

The method for overriding an autonomous vehicle wherein displaying the external view includes identifying potential hazardous external obstacles and displaying overlaid simulated navigation directions based on the vehicle actions.

The method for overriding an autonomous vehicle wherein the alternative vehicle actions comprise one of slowing down, increasing speed, maintaining the current speed, stopping, altering a course of the vehicle or making a turn.

The method for overriding an autonomous vehicle further comprising: learning the alternative vehicle actions selected by the authorized passenger in various intervention situations, wherein the displaying of the alternative vehicle actions is based on the previously selected alternative vehicle actions by the authorized passenger A smart device display system to override an autonomous vehicle decision, comprising: a smart device 100 comprising a processor 80, a memory 84, and a display 90 connected by a bus 88; an authorization module 87 residing in said memory and configured to receive an authorization code used to determine if the passenger is an authorized autonomous vehicle passenger; an artificial intelligence module 60 residing in said memory 84 and configured to learn from alternative vehicle actions selected by the authorized passenger in various intervention situations, wherein the artificial intelligence module uses machine learning algorithms 70 to decide alternative vehicle actions that the authorized passenger is likely to select for similar future situations; wherein said display displays the likely alternative vehicle actions, as determined by the artificial intelligence, to the authorized passenger of the autonomous vehicle that may be selected to override vehicle actions of the autonomous vehicle.

The smart device display system wherein the alternative vehicle actions comprise one of slowing down, increasing speed, maintaining the current speed, stopping, altering a course of the vehicle or making a Wm.

The smart device display system wherein the authorization of the autonomous vehicle passenger is done using a smart device.

DETAILED DESCRIPTION

The present invention may be further understood with reference to the following description and the appended drawings, wherein like elements are provided with the same reference numerals. The exemplary embodiments show a system, method and apparatus to inform passengers of the decisions made by an autonomous vehicle, based on external conditions, and provide the passenger with the ability to select alternative decisions, thus commanding the autonomous vehicle while the vehicle remains in autonomous driving mode.

It should be noted that the terms "decisions," "vehicle decisions," "actions," and "vehicle actions" may be used interchangeably throughout this description. In this description, these terms are used to describe the actions that will be taken by the autonomous vehicle based on the vehicle's programming. For example, based on external factors that the autonomous vehicle senses, the vehicle's software may decide to slow down, increase speed, maintain the current speed, come to a stop, alter the course of the vehicle, make a turn, etc. and cause the autonomous vehicle to perform the selected action. In addition, the term "alternative" may be used to modify these above terms. Where the term "alternative" is used to modify these terms, it indicates that an authorized passenger may select a different vehicle action or decision that is different from the one selected by the vehicle's programming.

Figure 1:
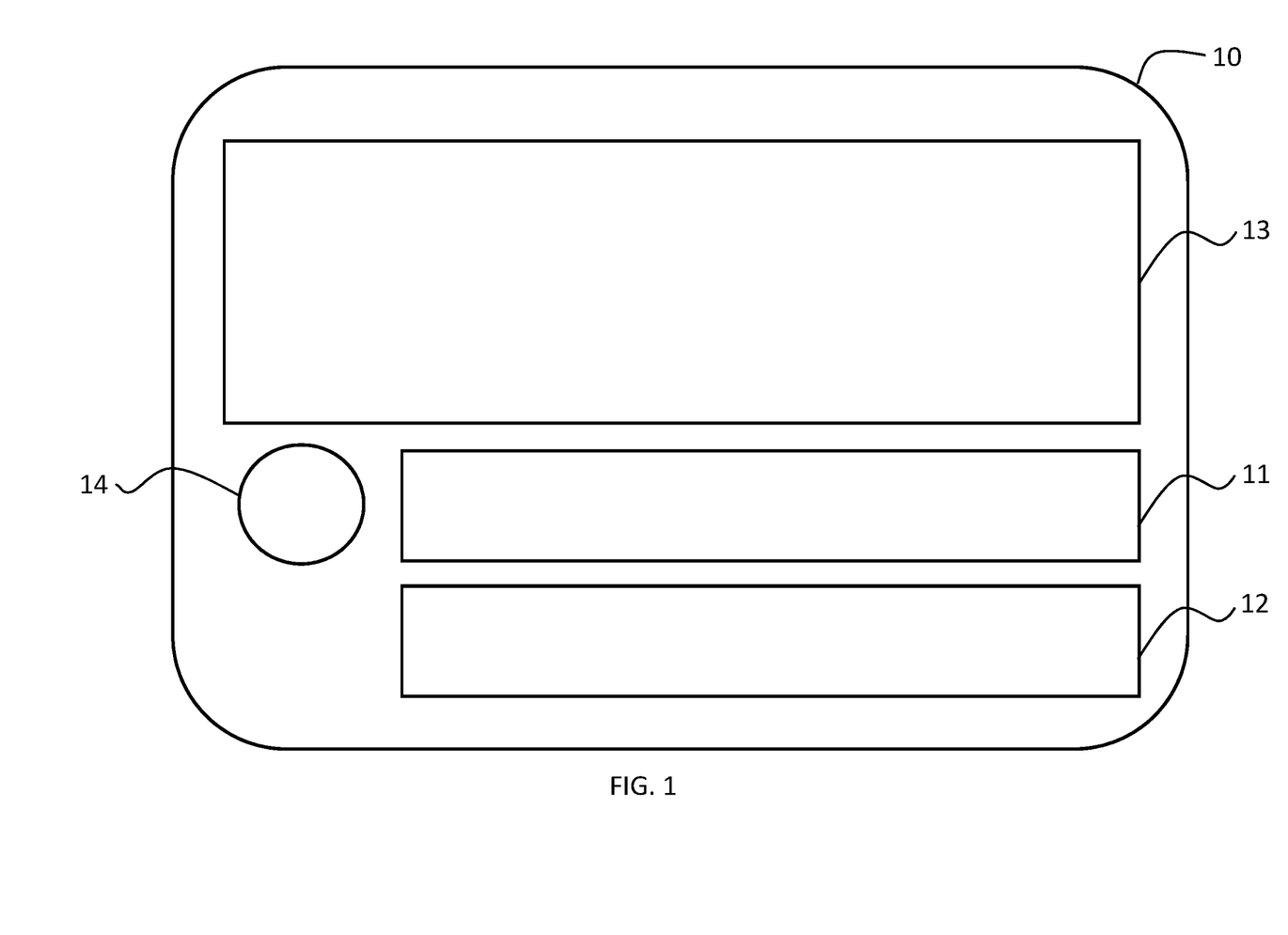
FIG. 1 shows a visual display that is used to inform passengers of the decisions made by an autonomous vehicle according to the exemplary embodiments.

FIG. 1 shows a visual display 10 that is used to inform passengers of the decisions made by an autonomous vehicle, based on external conditions, and provide the passenger with the ability to select alternative decisions, thus commanding the autonomous vehicle while the vehicle remains in autonomous driving mode. The display 10 may be of any type including but not limited to LCD, LED, or haptic displays. The display 10 may be located in any part of the vehicle, where it can either be in the front, left, right, top, bottom, or center of the vehicle. The display 10 may be either at a single or multiple locations in the autonomous vehicle. In one example, there may be a single display 10 that is within the reach of the person in the driver's seat. In another example, the single display 10 may be mounted in a center console such that the persons in the front seats may access the display 10. In a further example, each seat of the autonomous vehicle may have access to a display 10, e.g., the rear of the front seats may each include a display 10 that are accessible to the persons in the back seats. Also, the display 10 may be affixed, attached, or permanently mounted in the autonomous vehicle.

In the exemplary embodiment of FIG. 1, the display 10 is a touchscreen and comprises section 13 that continuously displays the external view where the vehicle is going along with the potentially hazardous external obstacles such as a pedestrian, vehicle, animal, ditch, or any other obstacle identified by sensors and/or computer processing. The display 10 may identify the potentially hazardous external obstacles. The identification of the potentially hazardous external obstacles may be via a graphical display on the display 10, a highlight on the display 10, an outline on the display 10 or any other manner of indicating to the passengers of the vehicle that there is a potentially hazardous external obstacle. The external view as shown in section 13 may comprise a front view, rear view, side views, or any other view depending upon the vehicle's movement. The external view of section 13 may also comprise the overlaid simulated navigation path of the autonomous vehicle to display the upcoming decisions and proceeding actions the autonomous vehicle plans to take based on sensor input from the external environment. This simulated navigation path of the autonomous vehicle can be demonstrated in a number of ways
comprising either independent or a combination of lines, arrows, images, moving images, animation, symbols, or any other simulated navigation path.

The section 13 may also display any sensor malfunctions of the autonomous vehicle or if a sensor is not functioning, informing the passenger of the vehicle's diminished capacity to make informed decisions.

The display 10 of FIG. 1 also comprises a section 11 listing the decisions and proceeding actions the vehicle will take based on sensor input from the external environment. In addition to listing the next steps that the vehicle is about to take, section 11 may also comprise additional visual indicators that indicate to the passengers if the vehicle is about to slow down, increase speed, maintain the current speed, come to a stop, make a turn, etc. The section 11 may also display any sensor malfunctions of the autonomous vehicle or if a sensor is not functioning, informing the passenger of the vehicle's diminished capacity to make informed decisions.

In addition to listing the decisions and proceeding or next actions the vehicle will take in section 11 of display 10, there may also be visual indicators located in different parts of the vehicle that indicate to the passengers if the vehicle is about to slow down, increase speed, maintain the current speed, come to a stop, make a turn, etc. Such visual indicators may be affixed, attached or permanently mounted in the vehicle at any location, wherein even if the passengers were not constantly looking at display 10, they would still be able to quickly look at the visual indicators located in one or multiple locations around the vehicle and know the next steps that the autonomous vehicle is about to take.

The display 10 of FIG. 1 also comprises a section 12 that provides for alternative decision options that can be selected by an authorized passenger if they want to override the default decisions listed in section 11. The alternative decision options may comprise altering vehicle course, stopping the vehicle, slowing down the vehicle, increasing the speed of the vehicle, etc.

An authorized passenger may be anyone designated by the vehicle owner as a person approved to override decisions made by an autonomous vehicle.

An alternative to continuous display of potentially hazardous external obstacles on section 13 of display 10 may be an inquiry function within section 13 itself or an external independent function that allows a passenger to inquire if the vehicle has detected a potentially hazardous external obstacle such as a pedestrian, vehicle, animal, ditch, etc. When the inquiry function is selected, section 13 will display the external obstacles the vehicle has detected, section 11 will display the default decisions made by the autonomous vehicle based on one or more external obstacles identified, and section 12 will provide alternative decision options for the passenger comprising of altering vehicle course, stopping the vehicle, slowing down the vehicle, increasing the speed of the vehicle, etc.

A substitute for section 12 of FIG. 1 that displays a list of alternative decision options may be that the section 13 itself displays the alternative decision options overlaid directly on the external view of section 13, wherein an authorized passenger would be able to select one or more of those alternative decision options and override the default decision of the autonomous vehicle. These alternative decision options may be integrated or overlaid on the external view of section 13 in a number of ways comprising of either independent or a combination of lines, arrows, images, moving images, animation, symbols, different color, etc. and would not be limited to just the ways mentioned above as long as those alternative decision options can be overlaid on section 13.

Another substitute for section 12 of FIG. 1 that displays a list of alternative decision options may be that the section 11 displays the alternative decision options in a new or a pop-up window when an authorized passenger selects an existing default decision or one of its subsets in section 11. In this case, an authorized passenger would be able to select one or more of those alternative decision options and override the default decision of the autonomous self-driving vehicle using section 11.

In addition, an alternative to section 11 of FIG. 1 that displays default decisions made by an autonomous vehicle, may be to overlay those default decisions on the external view of section 13 itself. In this case, passengers would be able to view the default decisions made by the autonomous vehicle directly on section 13.

FIG. 1 also shows a knob 14 in close proximity to display 10. The knob 14 provides the authorized passenger with the ability to select alternative decision options displayed in section 12 if display 10 is a non-touch type screen or as an alternative to using a touch sensitive display 10. In case if the alternative decision options are displayed in section 11 or section 13, then the knob 14 would still provide the authorized passenger with the ability to select alternative decision options in those sections.

Figure 2:
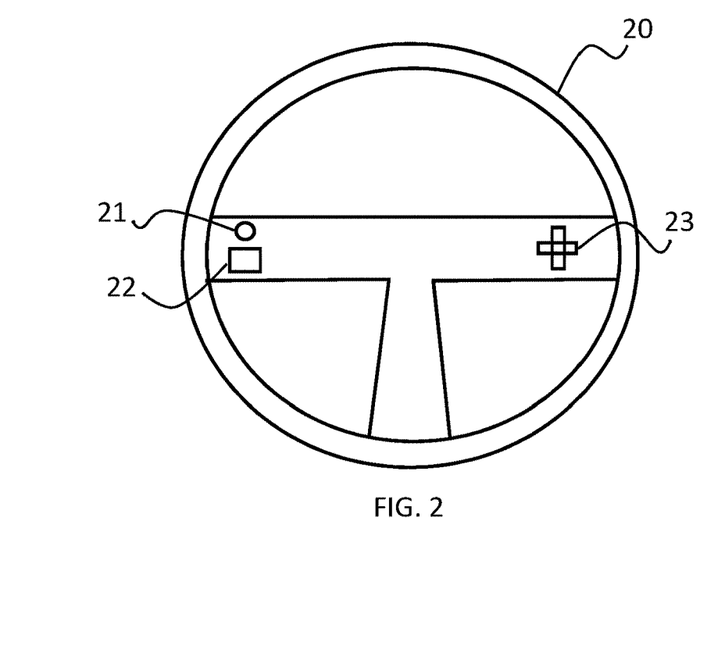
FIG. 2 shows an exemplary alternative mechanism to select alternative decision options via a vehicle steering wheel with a button according to the exemplary embodiments.

FIG. 2 also shows an alternative mechanism to select alternative decision options via a vehicle steering wheel with a button 21 that provides for voice operated functionality and allows the authorized passenger in the autonomous vehicle to select an alternative decision from section 12 of FIG. 1 via the passenger's voice, as received from various microphone sensors throughout the vehicle. The autonomous vehicle recognizes only the voice of authorized passengers. The authorized passenger's voice is recognized by the autonomous vehicle and the vehicle reacts accordingly. The passenger may select alternative decision options from section 12 in FIG. 1 via a voice command by holding button 21. It should be noted that, as described above, the voice input may be triggered by a button 21. However, there may be other manners of triggering the voice input. For example, the voice input may simply be triggered by an authorized passenger starting to speak and the voice input recognizing the authorized passenger's voice. In another example, the passenger may say a keyword to activate the decision system. The keyword may be, for example, the name of the system, a keyword programmed by the passenger, a keyword programmed by the vehicle maker, etc.

In case the alternative decision options are displayed in either section 11 or section 13 of FIG. 1 rather than section 12 of FIG. 1, then also holding the button 21 of FIG. 2 would allow the authorized passengers in the autonomous vehicle to be able to select those alternative decision options using the voice command. One or ordinary skill in the art would recognize that in order to command the vehicle, the authorized passengers of an autonomous vehicle can initiate their voice commands in many different ways without departing from the spirit and scope of the present invention and therefore would not be limited to any of the examples given above.

FIG. 2 also shows an example for adding an authorized passenger so that the vehicle will recognize the passenger's voice, a fingerprint scanning sensor 22. A user of the vehicle would be asked to set up their authorization using the fingerprint scanning sensor 22 when they first purchase, rent or get the autonomous vehicle. For example: by using scanning sensor 22, a user would add their fingerprint to the vehicle's onboard processing unit, making them an authorized passenger. If the user wants, then they would also be able to add additional authorized passengers and allow those passengers to also add their fingerprints to the onboard processing unit. Any of the authorized passengers of the autonomous vehicle would be able to pre-record their voice so the autonomous vehicle recognizes their voice later when the voice control is activated. It should be noted that any biometric sensor may be substituted for the fingerprint scanning sensor 22, e.g., a handprint sensor, a retina scan sensor, etc.

One or ordinary skill in the art would recognize that a fingerprint scanning sensor 22 can be placed any part of the autonomous vehicle and can be located at either single or multiple locations without departing from the spirit and scope of the present invention.

Authorized passengers would be able to use their voice to command the vehicle such as select alternative decision options, inquire if the vehicle has detected potentially hazardous external obstacles, etc. In other words, once a fingerprint has been stored, the authorized passenger may command the vehicle via voice button 21 and verify their identity as an authorized passenger via scanning sensor 22 or through voice recognition. Alternatively, an authorized passenger may also select alternative decision options and operate display 10 via the directional pad button 23. The button 23 provides for full operation of display 10 of FIG. 1 and allows the authorized passenger to select alternative decision options in section 12 of FIG. 1 to command the vehicle.

Figure 4:
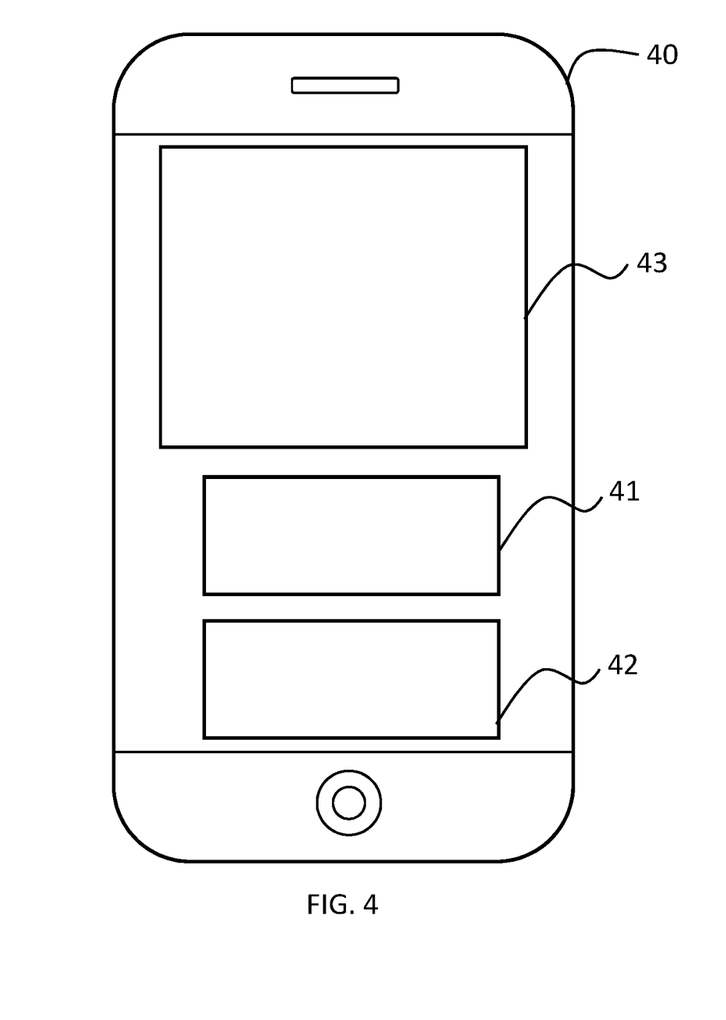
FIG. 4 shows a smart device display wherein the first display section displays an external view of the autonomous vehicle, the second display section displays vehicle actions that the autonomous vehicle will take and the third display section displays alternative vehicle actions that an authorized passenger of the autonomous vehicle may select to override the vehicle actions according to the exemplary embodiments.

According to an embodiment of the present invention, similar to the visual display 10 as shown in FIG. 1, a smart device 100 can also have similar display screens and software modules in it which would allow the authorized vehicle passengers to override autonomous car decisions. As shown in FIG. 4, the smart device will have a visual display 40, which would comprise of a first display section 43 that displays an external view of the autonomous vehicle, a second display section 41 that displays vehicle actions that the autonomous vehicle will take and a third display section 42 that displays alternative vehicle actions that an authorized passenger of the autonomous vehicle may select to override the vehicle actions. Such smart device can either be embedded within the vehicle or a user can carry that smart device with them. A few examples of the smart devices can be a smartphone, tablet, smart watch, etc. In other words, an authorized passenger may also select alternative decision options and operate display 40 on their smart device. Similar to visual display 10 of FIG. 1, as shown in FIG. 4, the smart device will comprise of and provide for full operation of display 40 including section 41, section 42, section 43, and allow the authorized passenger to select alternative decision options on their smart device to command or change the decisions made by the autonomous vehicle.

In such an embodiment, information or data needed to display section 41, section 42, section 43 on the smart device will be sent from the autonomous vehicle's computer processing unit to the smart device in real-time using wireless communication technologies such as dedicated short-range communications (DSRC) radio signals, Wi-Fi, Bluetooth, cellular, etc. In addition, an authorized user of the smart device will be able to override the decision of their autonomous vehicle using their smart device itself, wherein when the user selects any of the override functions on their smart device, that information will be immediately communicated to the autonomous vehicle's computer processing unit via wireless communication technologies such as dedicated short-range communications (DSRC) radio signals, Wi-Fi, Bluetooth, cellular, etc., and the autonomous vehicle will accordingly apply the override function selected by the smart device user.

Any of the alternate embodiments or alternate options mentioned above in this document above, which included either combination of display sections 13, 11, 12 of FIG. 1 will also be available on the smart device in respective combination of display sections 43, 41, 42.

Figure 5:
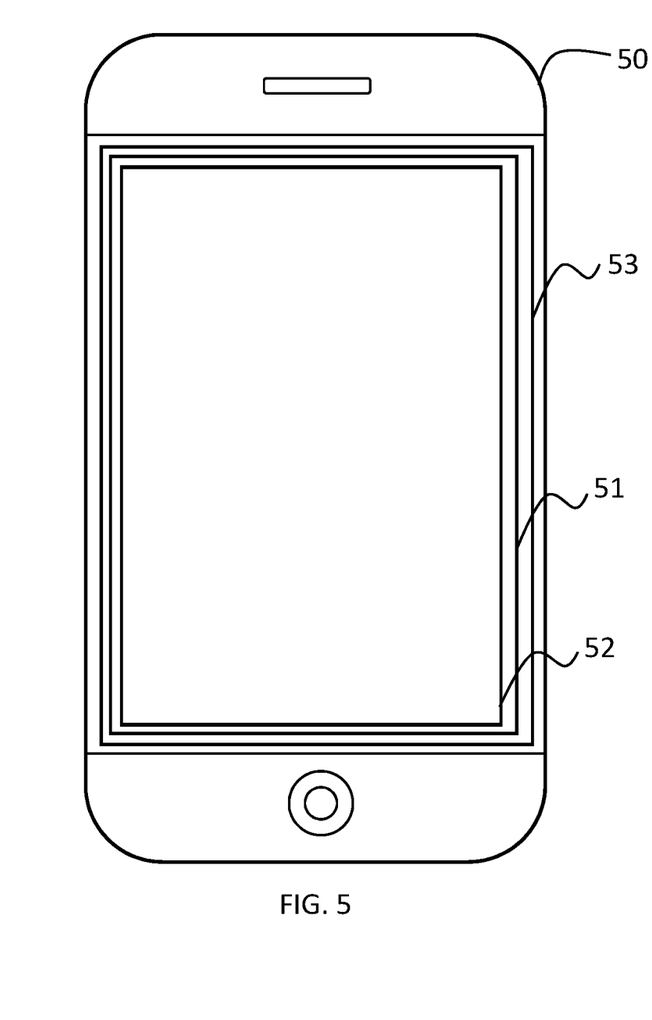
FIG. 5 shows a smart device display wherein the first display section that displays an external view of the autonomous vehicle, the second display section that displays vehicle actions that the autonomous vehicle will take and the third display section that displays alternative vehicle actions that an authorized passenger of the autonomous vehicle may select to override the vehicle actions are all overlaid on top of each other in form of cascading screens according to the exemplary embodiments.

As shown in FIG. 5, first display section 53 that displays an external view of the autonomous vehicle, a second display section 51 that displays vehicle actions that the autonomous vehicle will take and a third display section 52 that displays alternative vehicle actions that an authorized passenger of the autonomous vehicle may select to override the vehicle actions can all be overlaid on top of each other in the form of cascading screens, and that alternate embodiment can also be available on the smart device. In another example, one or ordinary skill in the art would recognize that section 51, section 52, section 53 as shown in FIG. 5 can all be overlaid on top of each other on the same screen of the smart device or they can also be separated in different sections of the smart device screen. Alternatively, section 51, section 52, section 53 can also be accessible by going to multiple screens of the smart device, and that would be within the spirit and scope of the present invention.

One of ordinary skill in the art will also recognize that the display 10 as shown in FIG. 1 and display 40 as shown in FIG. 4 can also be viewable simultaneously on both the smart device screen as well as the autonomous vehicle display screen, wherein autonomous vehicle override decision actions taken by a user on either the smart device screen or the autonomous vehicle display screen will show the changes real-time on the other screen (either smart device screen or autonomous vehicle display screen) too where the user didn't directly make the changes.

According to an embodiment of the present invention, similar to the visual display 10 as shown in FIG. 1, there can also be an augmented reality view in autonomous vehicle, which would allow the authorized vehicle passengers to override autonomous car decisions. The augmented reality view will have a display, which would comprise of a first display section that displays an external view of the autonomous vehicle, a second display section that displays vehicle actions that the autonomous vehicle will take and a third display section that displays alternative vehicle actions that an authorized passenger of the autonomous vehicle may select to override the vehicle actions. In such an embodiment, any actions that a user could have taken on the physical screen available on the autonomous vehicle will also be able to take those actions using the augmented reality view.

In another embodiment of the present invention, vehicle malfunctions or sensor malfunctions of the autonomous vehicle will also be displayed on the smart device which is connected to the autonomous vehicle. Such information about malfunctions will be communicated from the autonomous vehicle's computer processing unit to the smart device via wireless communication technologies such as dedicated short-range communications (DSRC) radio signals, Wi-Fi, Bluetooth, cellular, etc., and the smart device will then display those malfunctions along with other views or sections.

In another embodiment of the present invention, smart device will also allow an authorized passenger to use voice input in order to select the displayed alternative vehicle actions via voice command. In another embodiment of the present invention, smart device will also allow an authorized passenger to use free form voice to directly suggest an alternative vehicle action to the autonomous vehicle via their voice command.

Figure 3:
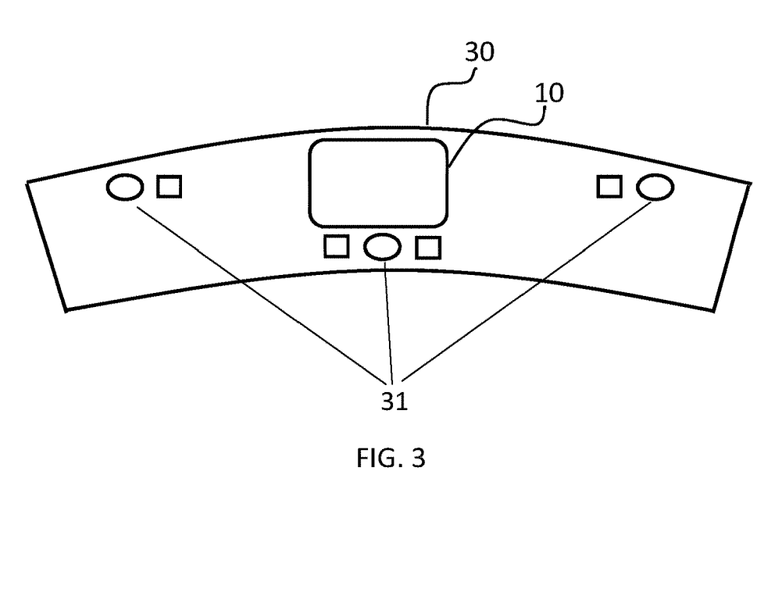
FIG. 3 shows an alternative exemplary embodiment to be able to select the alternative decision options listed on the display of FIG. 1.

FIG. 3 shows an alternative exemplary embodiment to be able to select the alternative decision options listed in the section 12 on display 10 of FIG. 1. Autonomous vehicles do not require a steering wheel, and as such voice activation buttons can no longer be centrally located on the steering wheel in vehicles without a steering wheel. FIG. 3 shows a dashboard 30 with a centrally located display 10 and various voice control buttons 31. The voice control button 31 provides the same functionality of button 21 in FIG. 2. Pressing button 31 would allow the authorized passenger in the autonomous vehicle to select an alternative decision from section 12 of FIG. 1 via the passenger's voice, as received from various microphone sensors throughout the vehicle. The autonomous vehicle recognizes only the voice of authorized passengers. The authorized passenger's voice is recognized by the autonomous vehicle and the vehicle reacts accordingly. The passenger may select alternative decision options from section 12 in FIG. 1 via a voice command by holding button 31.

An alternative to authorizing a passenger of an autonomous vehicle instead of a fingerprint scanner can be a facial recognition, optical/retinal recognition, ear shape recognition, other biometric recognition, or verbal or hand-entered passcode verification. Additionally, a passenger who enters a passcode or inserts the vehicle key would be allowed to view the alternate decision options as shown in section 12 of FIG. 1 on their personal digital screen, which would be within reach of their seat in the autonomous vehicle. Thus, any type of input sensor may be used to verify an authorized passenger. One of ordinary skill in the art would recognize that authorizing passengers of an autonomous vehicle can be done in many different ways as long as that authorization allows the passenger to command the autonomous vehicle. Therefore, any of such authorization methods would be within the spirit and scope of the present invention and would not be limited to the examples provided above.

An alternative way to authorize a passenger of an autonomous vehicle can be done using a smart device such as smartphone, smart watch, tablet, etc. When a smart device is used for authorization, the user of the smart device would unlock their smart device if it is locked and then open an autonomous vehicle app and put their login credentials in that app, which would authorize that user to be able to access autonomous vehicle decision override function and other available functions for the autonomous vehicle. In other words, a user with a smart device can also authorize themselves as an authorized passenger of an autonomous vehicle using an app on their smart device, which would transmit the authorization signal to the autonomous vehicle's computer processing unit via wireless communication technologies such as dedicated short-range communications (DSRC) radio signals, Wi-Fi, Bluetooth, cellular, etc. In addition, an authorized passenger of an autonomous vehicle can also authorize themselves by entering a verbal passcode, a hand-entered passcode, or get authorized using a biometric sensor on the smart device too.

An alternative to requiring an autonomous vehicle's passenger to be authorized before they can override the vehicle's default decisions can be that a particular seat in the vehicle can be assigned as the authorized seat, wherein the passenger that sits on that authorized seat would have access to review, inquire or especially override the autonomous vehicle's default decision. Similar to a driver seat in the traditional non-autonomous vehicles, there can be an authorized driver seat in the autonomous vehicle, wherein such passenger sitting on that authorized seat would automatically have the options available to be able to override the autonomous vehicle's default decisions. In this case, there would be no special requirement to authorize the passenger using mechanisms like a fingerprint scanner, facial recognition, password, or other authorization method before the passenger could review, inquire or override the autonomous vehicle's default decision.

In an alternate embodiment of the present invention, an authorized passenger of the autonomous vehicle can also be any passenger sitting in the front seats of the vehicle who can reach the autonomous vehicle dashboard or display screen by simply extending their hands while they continue to sit in their seats.

An alternative to requiring an autonomous vehicle's passenger to be authorized before they can override the vehicle's default decisions can be that any of the passengers sitting in the autonomous vehicle would be allowed to override the vehicle's default decisions i.e. any passenger could select alternative decision options so they can override the vehicle's default decisions. In this case, there would be no special requirement to authorize the passenger using mechanisms like fingerprint scanner, facial recognition, password, or other authorization method before the passengers could review, inquire or override the autonomous vehicle's default decision.

Figure 6:
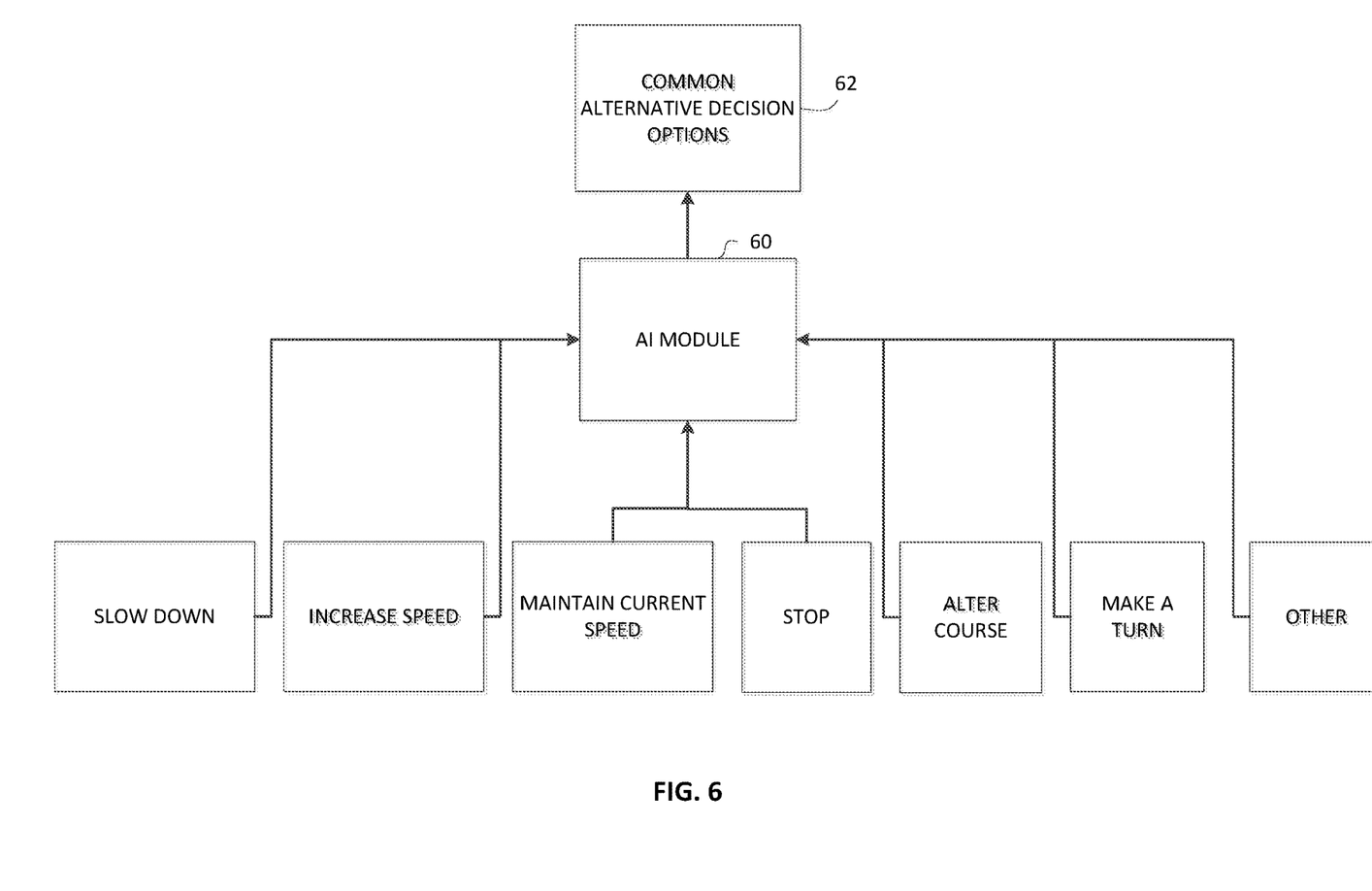
FIG. 6 is a schematic view of an artificial intelligence module learning common decisions and presenting commonly selected alternative decision options according to the exemplary embodiments.

The exemplary embodiments may also comprise an artificial intelligence module, wherein the vehicle would learn the common alternative decision options 62 that the authorized vehicle passenger usually selects under different manual intervention situations, and based on that artificial intelligence knowledge, system would quickly present those commonly selected alternative decision options to the users for future similar situations. Thus, the system would continue to learn and help the vehicle passengers with the future selection of their alternative decision options.

The above mentioned artificial intelligence module would also learn from the repeated actions of the authorized passenger based on different situations and accordingly alter the default decisions of the autonomous vehicle, so in future similar situations, an authorized passenger wouldn't have to do a manual intervention each time by selecting an alternate decision option. An example of this learning would be: if the authorized passenger, after seeing a child on the road, always selects the alternative decision option to stop the vehicle at a distance, then the artificial intelligence module of the autonomous vehicle would learn such behavior and accordingly alter the default decisions of the autonomous vehicle for similar future situations to meet the passenger's preference.

Figure 7:
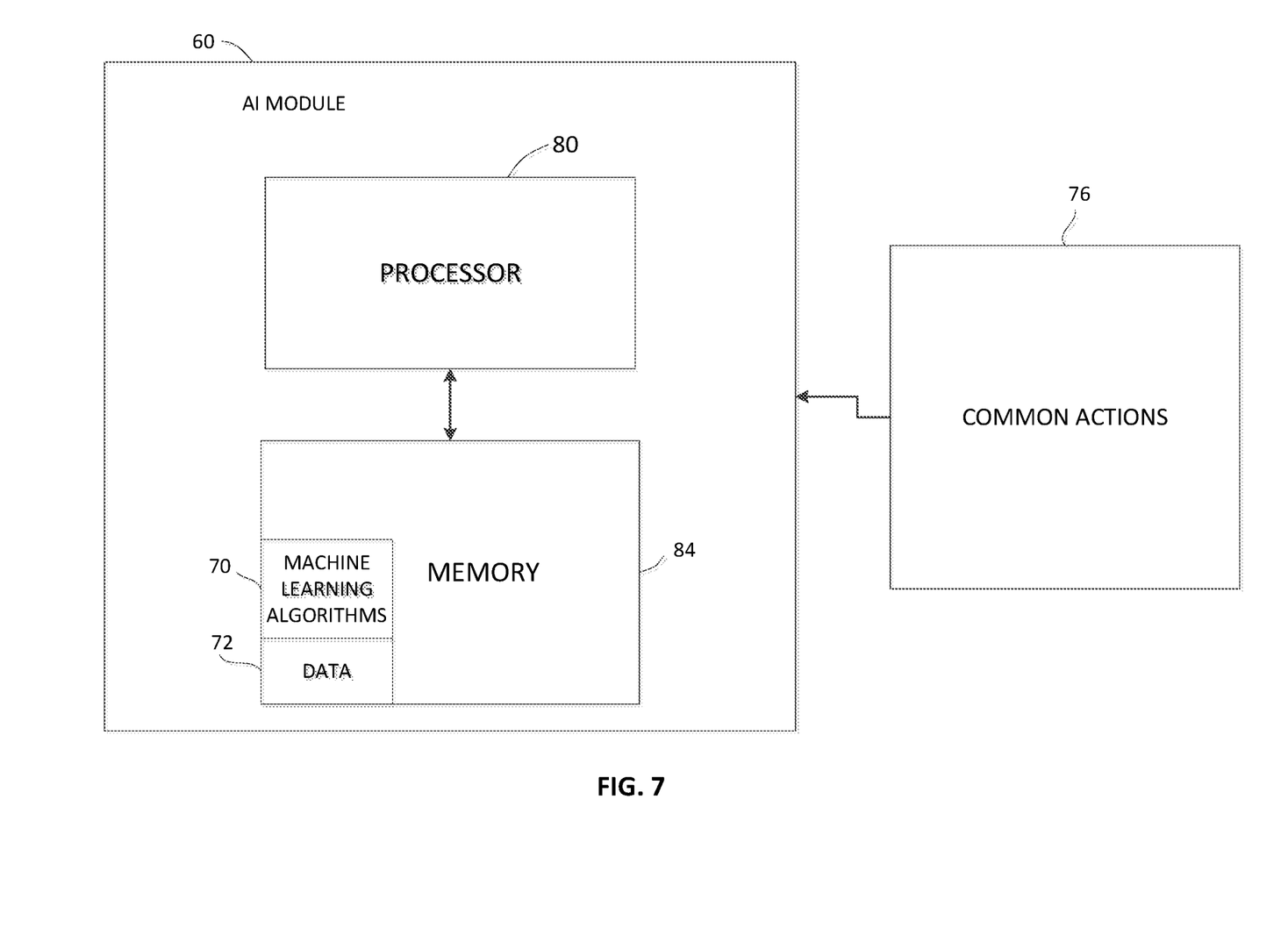
FIG. 7 is a schematic view of an artificial intelligence module according to the exemplary embodiments.
Figure 8:
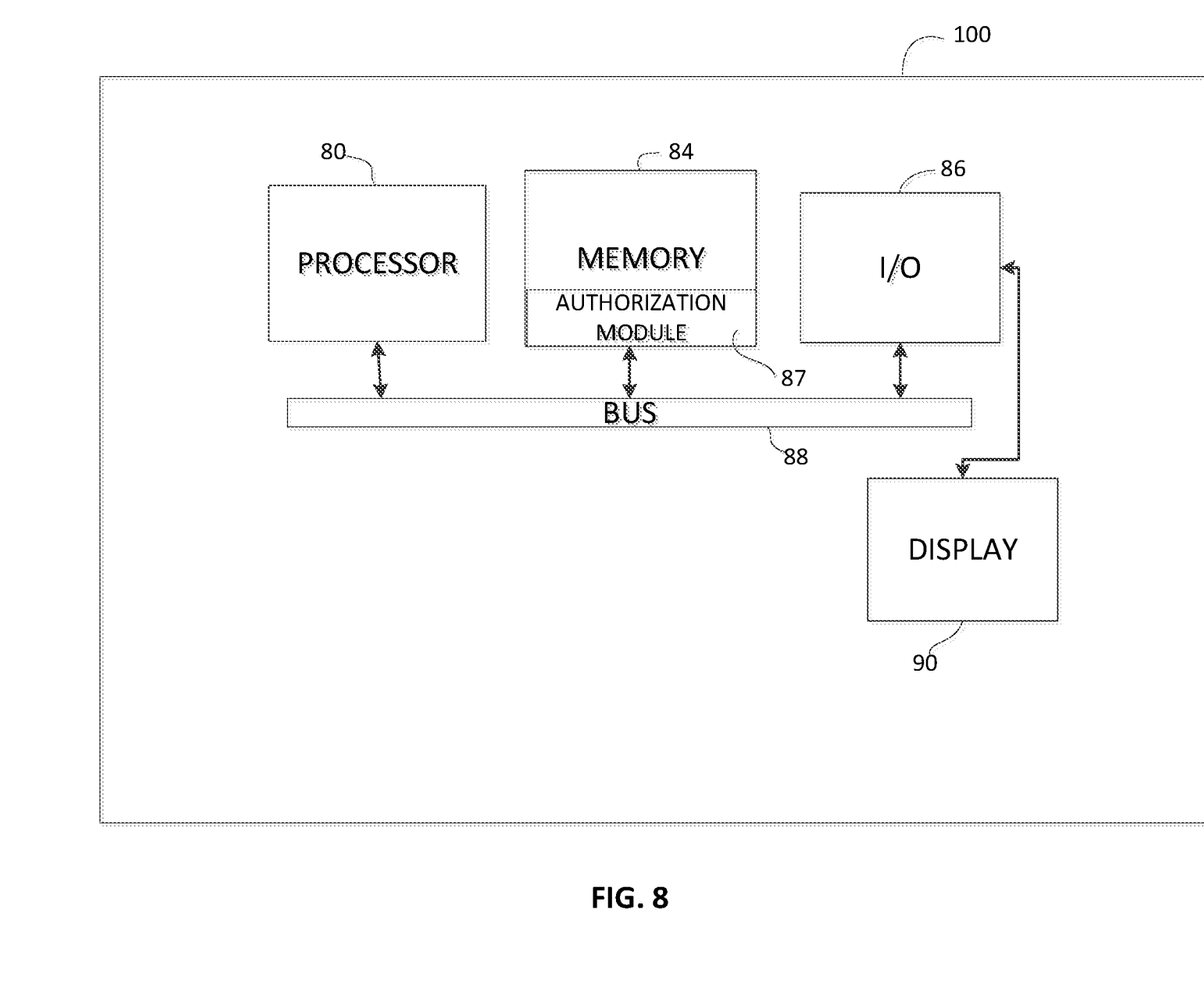
FIG. 8 is a schematic view of a smart device according to the exemplary embodiments.

The above mentioned artificial intelligence module 60 would comprise of memory 84, computer processor 80, machine learning algorithms and a pre-loaded test data set 72 that the machine learning algorithms 70 will use. Such pre-loaded test data set will consist of common actions 76 that the autonomous vehicle passengers would usually take in different situations when they want to override the autonomous vehicle's automated decision. The memory component of the artificial intelligence module would be used to store override decisions that the authorized passenger of the autonomous vehicle takes under different situations. Such data stored in memory will also be used by machine learning algorithms to compute the best possible action that an authorized passenger of a vehicle might possibly take in future based on the previous actions of authorized passenger in different situations, and then display those potential actions to the user on the autonomous car decision override system for quick selection in future. The computer processor component of the artificial intelligence system will assist the machine learning algorithms with their computing and storing the data in the memory. One or ordinary skill in the art would recognize that either of the classifications of the supervised, unsupervised or reinforcement machine learning algorithms can be used to provide best possible output for the artificial intelligence module.

Here are some examples of the Machine learning algorithms that can be used in this artificial intelligence module such as Naive Bayes Classifier Algorithm, K Means Clustering Algorithm, Support Vector Machine Algorithm, Apriori Algorithm, Linear Regression Algorithm, Logistic Regression Algorithm, Artificial Neural Networks Algorithm, Random Forests Algorithm, Decision Trees Algorithm, Nearest Neighbors Algorithm, etc. One of ordinary skill in the art would recognize that any other similar machine learning algorithms can also be used in the artificial intelligence module as long as they are used to come up with the best possible output i.e. potential action that an authorized passenger of a vehicle might possibly take in future based on the previous actions of that authorized passenger in different situations.

When the machine learning algorithms of the artificial intelligence module identify the best possible actions that an authorized passenger of the vehicle might possible take to override autonomous vehicle actions, it would communicate that data or information to the autonomous vehicle's computer processing unit, which would further display those alternative decision options based on the situation to the users for quick selection. In other words, the artificial intelligence module would continue to learn and help the vehicle passengers with the future selection of their alternative decision options.

In another embodiment of the present invention, when the machine learning algorithms of the artificial intelligence module identify the best possible actions that an authorized passenger of the vehicle might possible take to override autonomous vehicle actions, they will also be able to communicate that data or information to the authorized passenger's smart device, which would display those alternative decision options based on the situation to the users for quick selection. In another embodiment of the present invention, the artificial intelligence module mentioned above can also exist on the smart device of the authorized passenger of the autonomous vehicle, and that would be within the spirit and scope of the present invention.

In another embodiment of the present invention, when the machine learning algorithms of the artificial intelligence module identify the best possible actions that an authorized passenger of the vehicle might possible take to override autonomous vehicle actions, they will also be able to communicate that data or information to the augmented reality view within the autonomous vehicle, which would display those alternative decision options to the users for quick selection.

Any of the learning captured by artificial intelligence module would still consider safety of the passengers and the pedestrians as the highest priority and would not present an alternative decision option to the passengers that could impact or jeopardize safety. In section 12 of FIG. 1, any of the alternative decision options provided would always be such that they consider safety of the passengers and the pedestrians as the highest priority and would not present an alternative decision option to the passengers that could impact or jeopardize safety.

It will be appreciated by those skilled in the art that various modifications and alterations of the exemplary embodiments can be made without departing from the scope of the appended claims. Some of these have been discussed above and others will be apparent to those skilled in the art.

What is claimed is:

1. A smart device display for an autonomous vehicle, comprising:
   a first display section on the smart device that displays an external view of the autonomous vehicle;
   a second display section on the smart device that displays vehicle actions that the autonomous vehicle will take; and
   a third display section on the smart device that displays alternative vehicle actions that an authorized passenger of the autonomous vehicle may select to override the vehicle actions.

2. The smart device display of claim 1, wherein the first display section further identifies potential hazardous external obstacles based on the external view.

3. The smart device display of claim 1, wherein the first display section further displays overlaid simulated navigation directions based on the vehicle actions that the autonomous vehicle will take.

4. The smart device display of claim 1, wherein the vehicle actions are based at least in part on sensor readings of external obstacles.

5. The smart device display of claim 1, wherein one of the first display section or second display section displays one of vehicle malfunctions or sensor malfunctions.

6. The smart device display of claim 1, wherein the first display section, second display section, or third display section can be overlaid on top of each other on the smart device display screen.

7. The smart device display of claim 1, wherein a user of the smart device display can enable or disable any of the first display section, second display section, or third display section the display screen.

8. The smart device display of claim 1, wherein the alternative vehicle actions comprise one of slowing down, increasing speed, maintaining the current speed, stopping, altering a course of the vehicle or making a turn.

9. The smart device display of claim 1, wherein the first display section, second display section and third display section can be simultaneously displayed on both the smart device display screen as well as a separate display screen within the autonomous vehicle.

10. The smart device display of claim 1, wherein the autonomous vehicle includes an augmented reality view, and the first display section, second display section and third display section can be alternatively displayed on the augmented reality view within the autonomous vehicle, allowing the authorized passenger to select the alternative vehicle decision to override the autonomous vehicle decision using the augmented reality view.

11. The smart device display of claim 1, wherein a passenger is identified as an authorized passenger based on one of a verbal passcode, a manually entered passcode, or biometric data acquired by a biometric sensor on the smart device.

12. The smart device display of claim 1, wherein a passenger may speak a pre-set keyword to activate the autonomous vehicle override system using the smart device.

13. The smart device display of claim 1, further comprising:
an artificial intelligence module that learns the alternative vehicle actions the authorized passenger selects in various intervention situations, wherein the artificial intelligence module uses the learned alternative vehicle actions to display commonly selected alternative vehicle actions to the authorized passenger for similar future situations.

14. A method for overriding an autonomous vehicle decision using a smart device, comprising:
displaying an external view of the autonomous vehicle;
displaying vehicle actions that the autonomous vehicle will take;
displaying alternative vehicle actions that the autonomous vehicle may take;
receiving a selection of the alternative vehicle actions from an authorized passenger of the autonomous vehicle using a smart device; and
overriding the vehicle actions with the selected alternative vehicle actions.

15. The method of claim 14, wherein displaying the external view includes identifying potential hazardous external obstacles and displaying overlaid simulated navigation directions based on the vehicle actions.

16. The method of claim 14, wherein the alternative vehicle actions comprise one of slowing down, increasing speed, maintaining the current speed, stopping, altering a course of the vehicle or making a turn.

17. The method of claim 14, further comprising:
learning the alternative vehicle actions selected by the authorized passenger in various intervention situations, wherein the displaying of the alternative vehicle actions is based on the previously selected alternative vehicle actions by the authorized passenger.

18. A smart device display system to override an autonomous vehicle decision, comprising:
a smart device comprising a processor, a memory, and a display connected by a bus;
an authorization module residing in said memory and configured to receive an authorization code used to determine if the passenger is an authorized autonomous vehicle passenger;
an artificial intelligence module residing in said memory and configured to learn from alternative vehicle actions selected by the authorized passenger in various intervention situations, wherein the artificial intelligence module uses machine learning algorithms to decide alternative vehicle actions that the authorized passenger is likely to select for similar future situations;
wherein said display displays the likely alternative vehicle actions, as determined by the artificial intelligence, to the authorized passenger of the autonomous vehicle that may be selected to override vehicle actions of the autonomous vehicle.

19. The smart device display system of claim 18, wherein the alternative vehicle actions comprise one of slowing down, increasing speed, maintaining the current speed, stopping, altering a course of the vehicle or making a turn.

20. The smart device display system of claim 18, wherein the authorization of the autonomous vehicle passenger is done using the smart device.

21. A smart device display for an autonomous vehicle, comprising:
a first display section on the smart device that displays an external view of the autonomous vehicle;
a second display section on the smart device that displays vehicle actions that the autonomous vehicle will take; and
a third display section on the smart device that displays alternative vehicle actions that an authorized passenger of the autonomous vehicle may select to override the vehicle actions,
wherein the first display section, second display section, or third display section can be overlaid on top of each other on the smart device display screen.

22. The smart device display of claim 21, wherein a user of the smart device display can enable or disable any of the first display section, second display section, or third display section on the display screen.

23. The smart device display of claim 21, wherein a passenger is identified as an authorized passenger based on one of a verbal passcode, a manually entered passcode, or biometric data acquired by a biometric sensor on the smart device.

24. The smart device display of claim 21, further comprising:
an artificial intelligence module that learns the alternative vehicle actions the authorized passenger selects in various intervention situations, wherein the artificial intelligence module uses the learned alternative vehicle actions to display commonly selected alternative vehicle actions to the authorized passenger for similar future situations.

* * * * *